(12) United States Patent
Yang et al.

(10) Patent No.: US 9,161,375 B2
(45) Date of Patent: Oct. 13, 2015

(54) METHOD FOR SHARING ACCESS TO A WIRELESS LAN ACCESS POINT

(75) Inventors: Zin-How Yang, Taichung (TW); Jung-Tang Chiang, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 174 days.

(21) Appl. No.: 13/446,528

(22) Filed: Apr. 13, 2012

(65) Prior Publication Data
US 2012/0265861 A1 Oct. 18, 2012

(30) Foreign Application Priority Data

Apr. 15, 2011 (TW) .............................. 100113177 A

(51) Int. Cl.
*G06F 15/16* (2006.01)
*H04W 76/02* (2009.01)
*H04W 12/06* (2009.01)

(52) U.S. Cl.
CPC .............. *H04W 76/02* (2013.01); *H04W 12/06* (2013.01)

(58) Field of Classification Search
CPC .............................. G06F 15/177; H04L 29/06
USPC ........................................................ 709/220
See application file for complete search history.

(56) References Cited

U.S. PATENT DOCUMENTS

2009/0055541 A1 2/2009 Fujiwara et al.
2011/0058536 A1 3/2011 Tsuchiya et al.

FOREIGN PATENT DOCUMENTS

CN 101147362 A 3/2008

OTHER PUBLICATIONS

Search Report dated Sep. 9, 2013 in corresponding Taiwan Application No. 100113177 together with English language translation of same.
Search Report dated Feb. 2, 2015 in Chinese Application No. 20120046154.5, together with an English language translation of the same.

*Primary Examiner* — Shripal Khajuria
(74) *Attorney, Agent, or Firm* — McClure, Qualey & Rodack, LLP

(57) ABSTRACT

A method for sharing access to a wireless LAN access point is applicable between a target client device and a host device which is coupled to the wireless LAN access point, and includes the steps of: configuring the host device to send an invite request to the target client device, configuring the host device to receive an invite response sent by the target client device, and configuring the host device to exchange connection information with the target client device, such that the target client device may connect to the wireless LAN access point according to the connection information.

7 Claims, 5 Drawing Sheets

METHOD FOR SHARING ACCESS TO A WIRELESS LAN ACCESS POINT

CROSS-REFERENCE TO RELATED APPLICATION

This application claims priority of Taiwanese Application No. 100113177, filed on Apr. 15, 2011.

BACKGROUND OF THE INVENTION

1. Field of the Invention

The present invention relates to a method for sharing access to an access point, more particularly to a method for sharing access to a wireless LAN access point.

2. Description of the Related Art

Currently many electronic devices are connectible to a wireless local area network access point (WLAN AP).

In general, coupling an electronic device to a WLAN AP includes the steps of:

1. configuring the electronic device to search for WLAN access points close to the electronic device;

2. configuring the electronic device to select one of the WLAN access points for connecting thereto;

3. when the selected WLAN AP is protected with a password, the electronic device is required to send a legitimate password to the WLAN AP for verification; and 4. after the WLAN AP receives and verifies the legitimate password, the electronic device may connect to the WLAN AP.

It is noted from the aforementioned steps that when it is intended for an electronic device to connect to a WLAN AP, the electronic device is required to obtain the legitimate password in advance, and the WLAN AP verifies each electronic device so as to determine whether a legitimate connection can be established with the corresponding electronic device. Therefore, as the number of electronic devices that legitimately connect to the WLAN AP gets larger, a risk of password leakage also gets higher. Moreover, when the legitimate password for the WLAN AP is updated, each of the electronic devices that may legitimately connect to the WLAN AP is required to obtain the updated legitimate password so as to be able to connect normally to the WLAN AP. However, in this way, a relatively high management cost of the WLAN AP is incurred.

SUMMARY OF THE INVENTION

Therefore, an object of the present invention is to provide a method for sharing access to a wireless LAN access point so as to overcome the aforesaid drawbacks of the prior art.

In a first aspect of the present invention, the method for sharing access to a wireless LAN access point is applicable between a target client device and a host device which is coupled to the wireless LAN access point, and comprises the steps of:

configuring the host device to send an invite request to the target client device;

configuring the host device to receive an invite response sent by the target client device; and configuring the host device to exchange connection information with the target client device, such that the target client device may connect to the wireless LAN access point according to the connection information.

In a second aspect of the present invention, the method for sharing access to a wireless LAN access point is applicable between a target client device and a host device which is coupled to the wireless LAN access point, and comprises the steps of:

configuring the target client device to receive an invite request sent by the host device;

configuring the target client device to output an invite response for receipt by the host device;

configuring the target client device to exchange connection information with the host device; and configuring the target client device to connect to the wireless LAN access point via the host device according to the connection information.

BRIEF DESCRIPTION OF THE DRAWINGS

Other features and advantages of the present invention will become apparent in the following detailed description of the two preferred embodiments with reference to the accompanying drawings, of which.

DETAILED DESCRIPTION OF THE PREFERRED EMBODIMENTS

Figure 1:
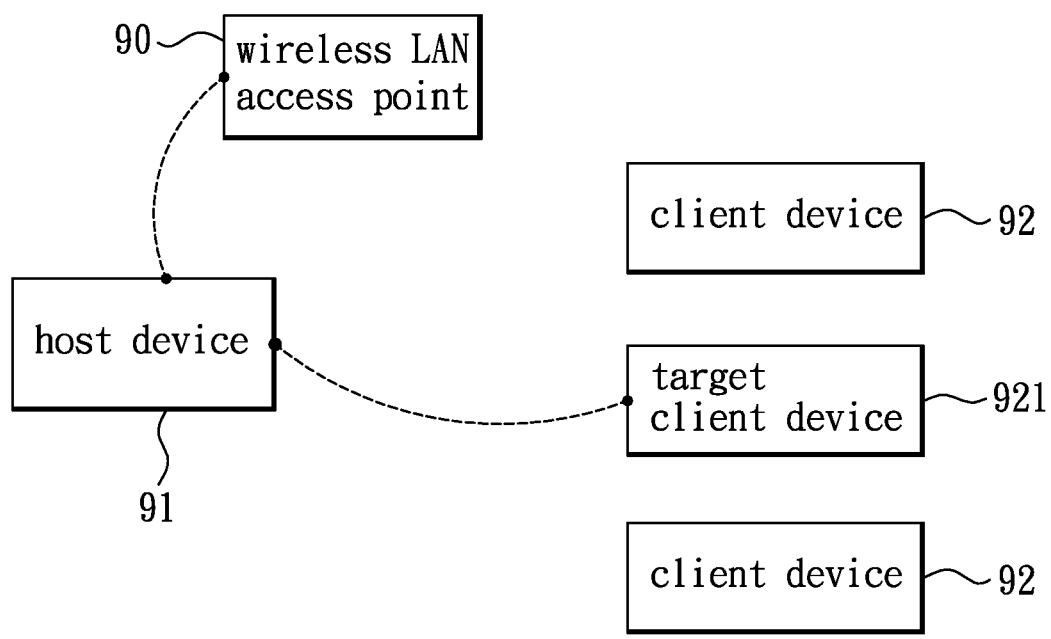
FIG. 1 is a block diagram of a system that implements a first preferred embodiment of a method for sharing access to a wireless LAN access point, according to the present invention.
Figure 2:
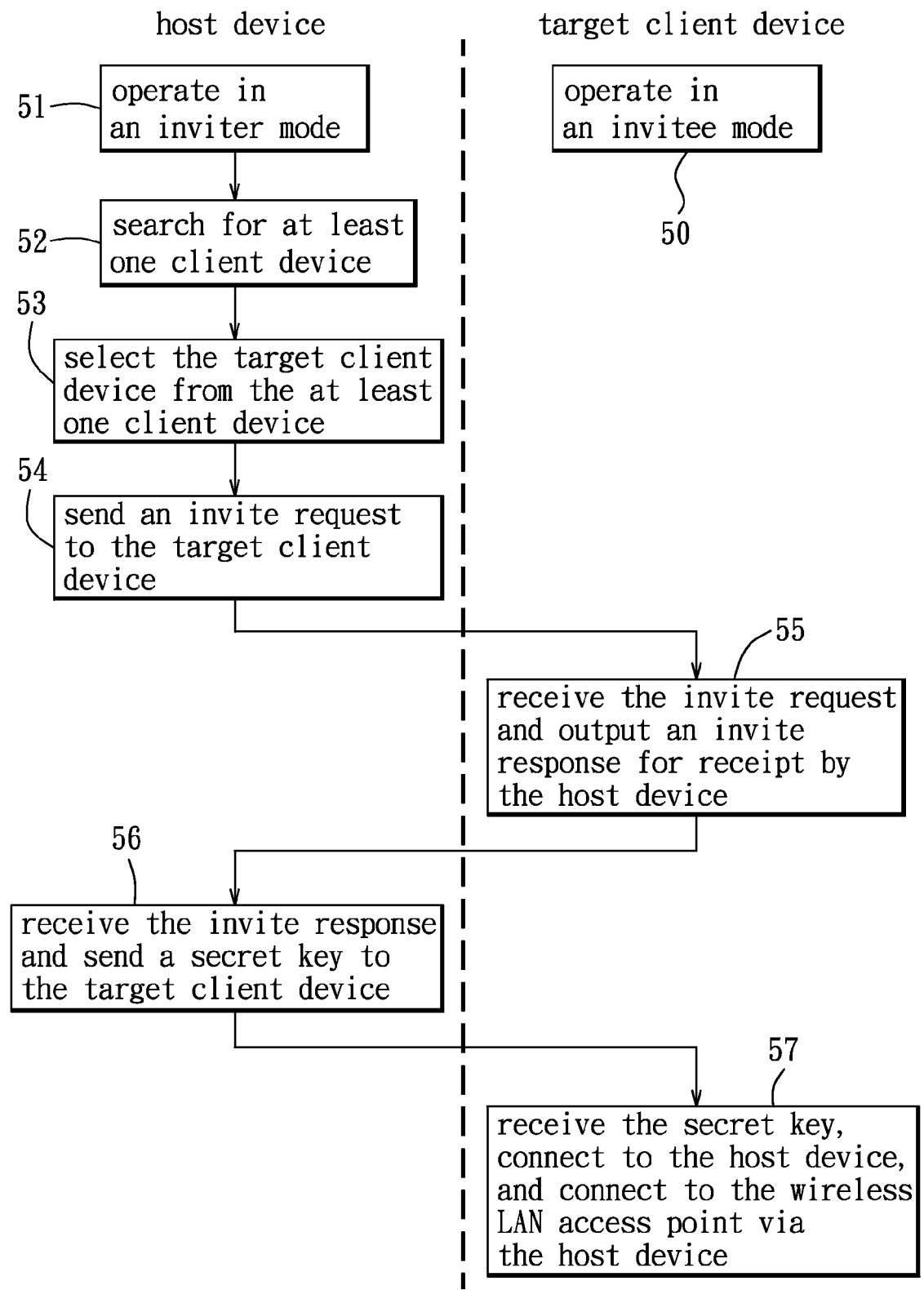
FIG. 2 is a flowchart illustrating the first preferred embodiment.
Figure 3:
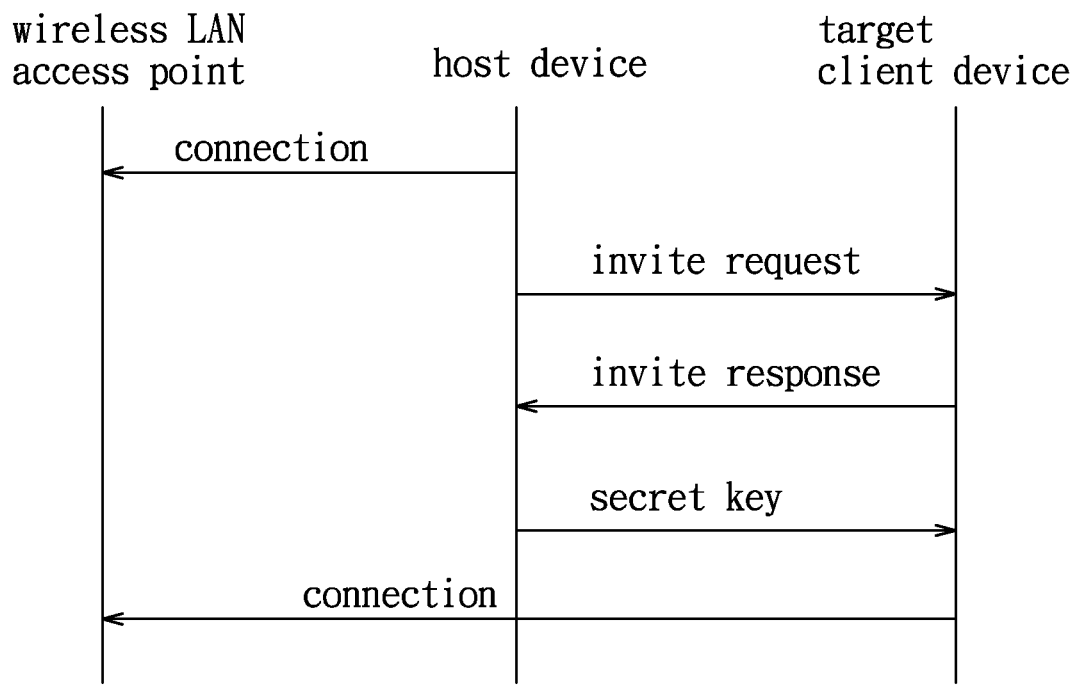
FIG. 3 is a schematic diagram illustrating a process of signal exchanges in the first preferred embodiment.

Referring to FIG. 1 to FIG. 3, the first preferred embodiment of a method for sharing access to a wireless local area network (LAN) access point, according to the present invention, is applicable between a target client device 921 and a host device 91 which is coupled to the wireless LAN access point 90, and comprises steps 50 to 57.

In step 51, the host device 91 is configured to operate in an inviter mode. In this embodiment, a communication protocol of Wireless Fidelity (Wi-Fi) is adopted for the purpose of illustration. In the inviter mode, the host device 91 may send an invite request to the target client device 921. In other words, the host device 91 is an inviter.

In step 52, the host device 91 is configured to search for at least one client device 92 close to the host device 91, and to obtain an operating mode of each client device 92.

In step 53, the host device 91 is configured to select the target client device 921 from the at least one client device 92. The target client device 921 is configured to operate in an invitee mode in advance in step 50.

In step 54, the host device 91 is configured to send the invite request to the target client device 921.

In step 55, the target client device 921 is configured to receive the invite request and to output an invite response for receipt by the host device 91, so as to confirm that the target client device 921 has accepted the invite request from the host device 91.

In step 56, the host device 91 is configured to receive the invite response and to exchange connection information with the target client device 921. For example, step 56 may include configuring the host device 91 to send a key to the target client device 921. In this embodiment, the key is a secret key based on Wi-Fi Protected Setup (WPS). Since the feature of the present invention does not reside in the detailed configuration of encryption and decryption relevant to the secret key, which is known in the art, further details of the same are omitted herein for the sake of brevity.

In step 57, the target client device 921 is configured to exchange the connection information with the host device 91. For example, step 57 may include configuring the target client device 921 to receive the secret key sent by the host device 91, such that, without knowing a login password for the wireless LAN access point 90, the target client device 921 may become a legitimate connection electronic device, may connect to the host device 91, and may connect to the wireless LAN access point 90 via the host device 91.

Figure 4:
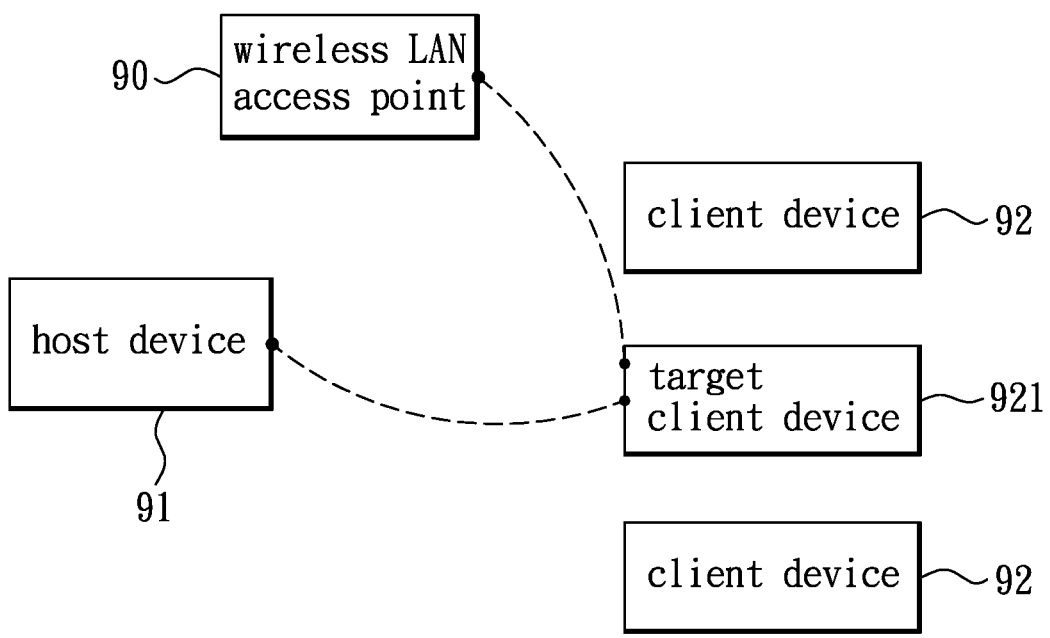
FIG. 4 is a block diagram of a system that implements a second preferred embodiment of the method for sharing access to a wireless LAN access point, according to the present invention.
Figure 5:
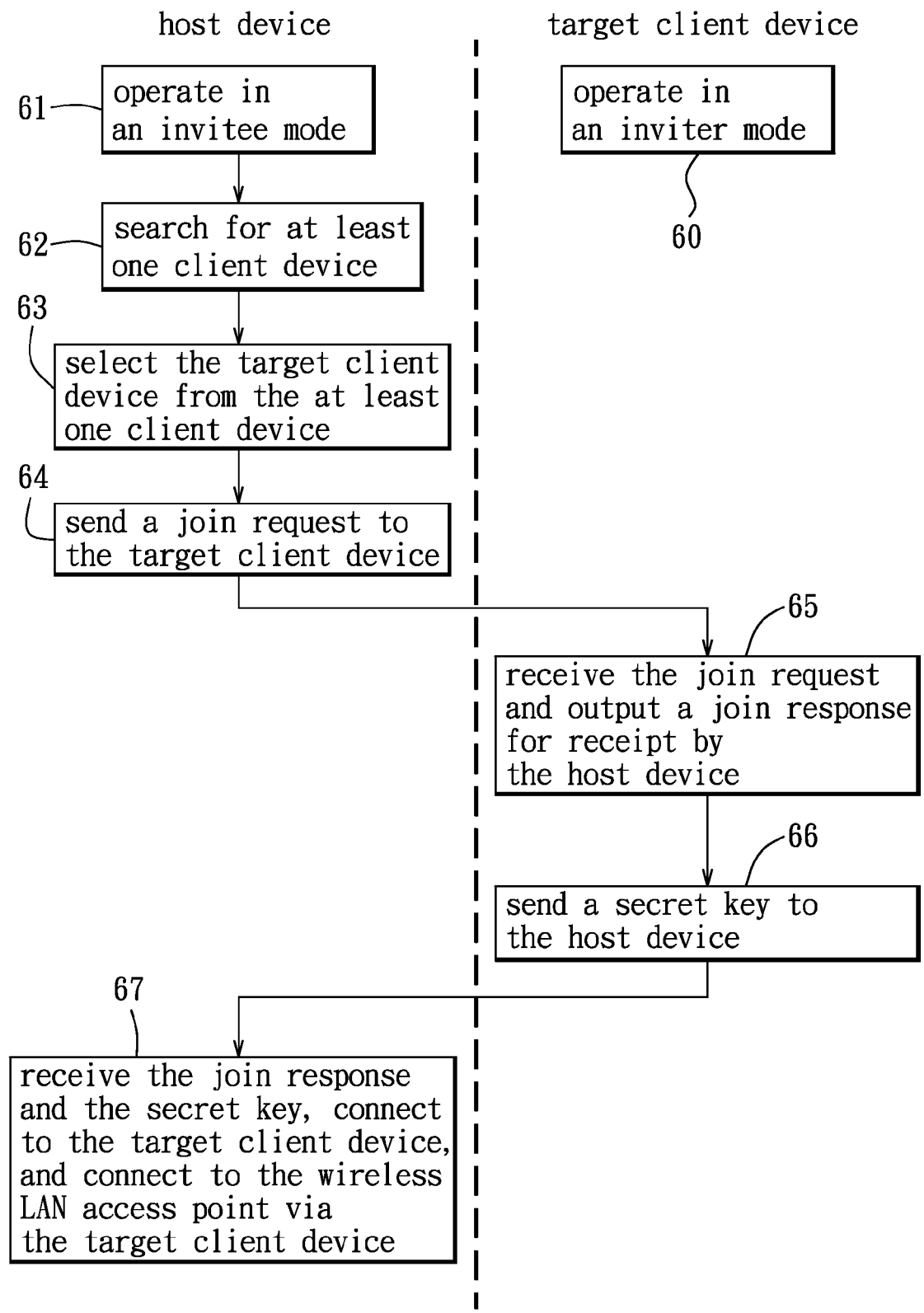
FIG. 5 is a flowchart illustrating the second preferred embodiment.
Figure 6:
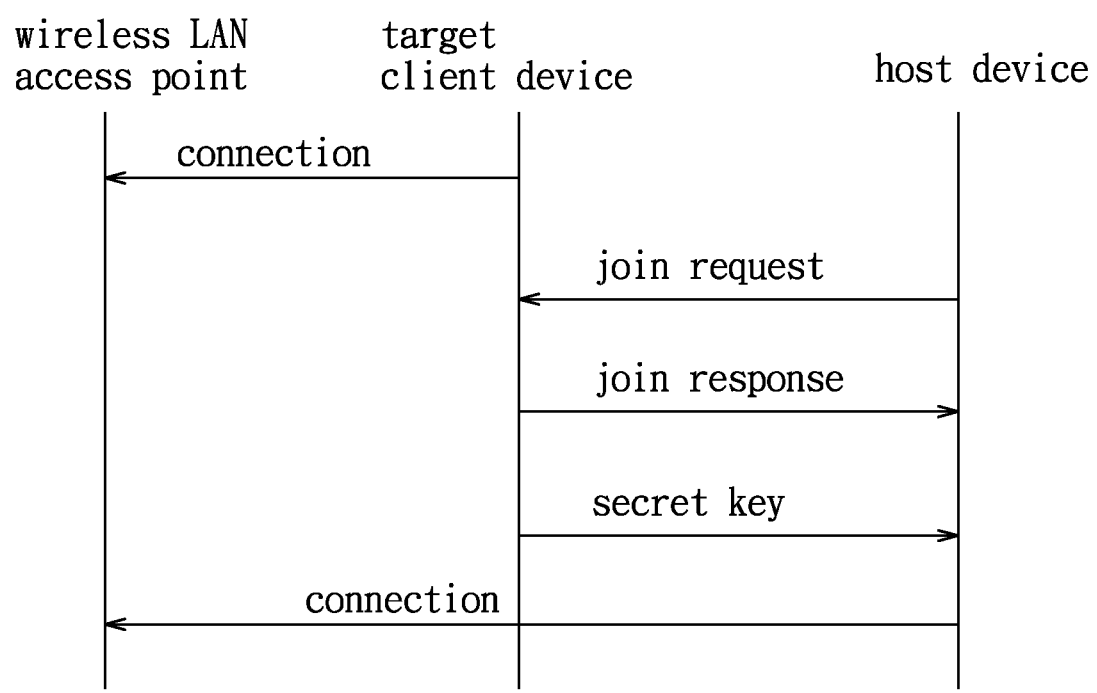
FIG. 6 is a schematic diagram illustrating a process of signal exchanges in the second preferred embodiment.

Referring to FIG. 4 to FIG. 6, the second preferred embodiment of the method for sharing access to a wireless LAN access point, according to the present invention, is applicable between a host device 91 and a target client device 921 which is coupled to the wireless LAN access point 90, and comprises steps 60 to 67.

In step 61, the host device 91 is configured to operate in an invitee mode. In this embodiment, a communication protocol of Wireless Fidelity (Wi-Fi) is given as an example for the purpose of illustration. In the invitee mode, the host device 91 may send a join request. In other words, the host device 91 is an invitee.

In step 62, the host device 91 is configured to search for at least one client device 92 close to the host device 91, and to obtain an operating mode of each client device 92.

In step 63, the host device 91 is configured to select the target client device 921 from the at least one client device 92. The target client device 921 is configured to operate in an inviter mode in advance in step 60.

In step 64, the host device 91 is configured to send the join request to the target client device 921.

In step 65, the target client device 921 is configured to receive the join request and to output a join response for receipt by the host device 91, so as to confirm that the target client device 921 has accepted the join request from the host device 91.

In step 66, the target client device 921 is configured to exchange connection information with the host device 91. For example, step 66 may include configuring the target client device 921 to send a key to the host device 91. In this embodiment, the key is a secret key based on Wi-Fi Protected Setup (WPS).

In step 67, the host device 91 is configured to receive the join request and to exchange the connection information with the target client device 921. For example, step 67 may include configuring the host device 91 to receive the secret key sent by the target client device 921, such that, without knowing the login password for the wireless LAN access point 90, the host device 91 may become a legitimate connection electronic device, may connect to the target client device 921, and may connect to the wireless LAN access point 90 via the target client device 921.

To sum up, in these preferred embodiments of the present invention, the host device or the target client device may connect to the wireless LAN access point by means of the method for sharing access to a wireless LAN access point, and may use a secret key for verification. Therefore, in the wireless LAN, only one electronic device (the host device or the target client device) is required to be coupled to the wireless LAN access point, and other electronic devices may become legitimate connection electronic devices without knowing the login password of the wireless LAN access point. For this reason, a risk of leakage of the login password for the wireless LAN access point will be substantially reduced. Meanwhile, once the login password is updated, the electronic device that is coupled to the wireless LAN access point may automatically generate an updated secret key. Consequently, the other legitimate connection electronic devices are only required to obtain the updated secret key through the aforementioned method, so as to indirectly connect to the wireless LAN access point via the electronic device that is coupled to the wireless LAN access point.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for sharing access to a wireless LAN access point, the method being applicable between a target client device and a host device which is coupled to the wireless LAN access point, wherein the host device has an established communication coupling with the wireless LAN access point and the target device not having an established communication coupling with the wireless LAN access point, the method comprising the steps of:

configuring the host device to send an invite request directly to the target client device, the host device having access to a network via the wireless LAN access point, wherein the invite request is configured for inviting the target device to share access to the wireless LAN access point;

configuring the host device to receive an invite response sent directly to the host device by the target client device; and configuring the host device, in response to receiving the invite response from the target client device, to exchange connection information directly with the target client device, the exchanged connection information being information necessary for the target client device to establish a communication coupling with the wireless LAN access point, such that the target client device thereafter uses the exchanged connection information to connect to the wireless LAN access point via the host device according to the connection information.

2. The method as claimed in claim 1, wherein the step of configuring the host device to exchange the connection information with the target client device includes:

configuring the host device to send a key to the target client device, such that the target client device connects to the wireless LAN access point according to the key.

3. The method as claimed in claim 1, further comprising: configuring the host device to search for a client device close to the host device.

4. The method as claimed in claim 1, further comprising: configuring the host device to operate in an inviter mode.

5. A method for sharing access to a wireless LAN access point, the method being applicable between a target client device and a host device which is coupled to the wireless LAN access point, wherein the host device has an established communication coupling with the wireless LAN access point and the target device not having an established communication coupling with the wireless LAN access point, the method comprising the steps of:

configuring the target client device to receive an invite request sent directly by the host device, the host device having access to a network via the wireless LAN access point, wherein the invite request is configured for inviting the target device to share access to the wireless LAN access point;

configuring the target client device to output directly to the host device an invite response for receipt by the host device;

configuring the target client device, in response to receiving the invite response by the host device, to exchange connection information directly with the host device, the exchanged connection information being information necessary for the target client device to establish a communication coupling with the wireless LAN access point; and using the exchanged connection information to configure the target client device to connect to the wireless LAN access point via the host device according to the connection information.

6. The method as claimed in claim 5, wherein the step of configuring the target client device to exchange the connection information with the host device includes:

configuring the target client device to receive a key sent by the host device.

7. The method as claimed in claim 5, further comprising: configuring the target client device to operate in an invitee mode.

* * * * *